United States Patent [19]
Evans et al.

[11] Patent Number: 4,845,967
[45] Date of Patent: * Jul. 11, 1989

[54] SPRING-FREE LOCKING CABLE LOCK

[76] Inventors: Daniel S. Evans, 1327 Tamarisk Dr., West Linn, Oreg. 97068; Lawrence P. Hall, 2601 S.E. 170th St., Portenland, Oreg. 97236

[*] Notice: The portion of the term of this patent subsequent to Sep. 15, 2004 has been disclaimed.

[21] Appl. No.: 93,695

[22] Filed: Sep. 8, 1987

Related U.S. Application Data

[63] Continuation-in-part of Ser. No. 945,000, Dec. 22, 1986.

[51] Int. Cl.4 .............................................. B62H 5/00
[52] U.S. Cl. ............................................ 70/233; 70/18
[58] Field of Search ...................... 70/283, 18, 30, 49, 70/134, 234, 235, 236

[56] References Cited

U.S. PATENT DOCUMENTS

| | | | |
|---|---|---|---|
| 1,991,825 | 2/1935 | Strickland | 70/233 |
| 3,486,351 | 12/1969 | Bankam | 70/134 |
| 3,910,602 | 10/1975 | Lindner | 70/233 |
| 4,693,098 | 9/1987 | Davis | 70/233 |

FOREIGN PATENT DOCUMENTS

| | | | |
|---|---|---|---|
| 3046810 | 7/1982 | Fed. Rep. of Germany | 70/233 |
| 7806670 | 12/1979 | Netherlands | 70/233 |

Primary Examiner—Robert L. Wolfe
Attorney, Agent, or Firm—Jerome J. Norris

[57] ABSTRACT

A spring-free cable-lock device for tubular frame vehicles having a swaged end cable with identical halves of a phallic head as a plug for insertion into a lock member, comprising a sliding latch plate with a semi-circular opening which aligns with a groove in the phallic head to form a lock.

5 Claims, 2 Drawing Sheets

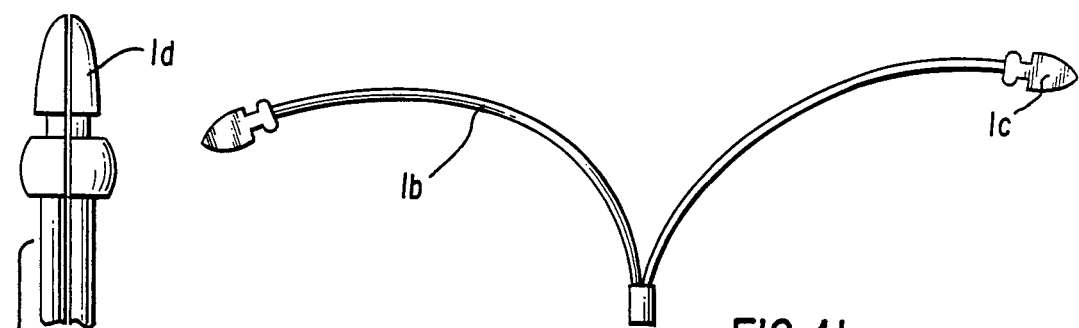
FIG. 1a
FIG. 1b
FIG. 1c
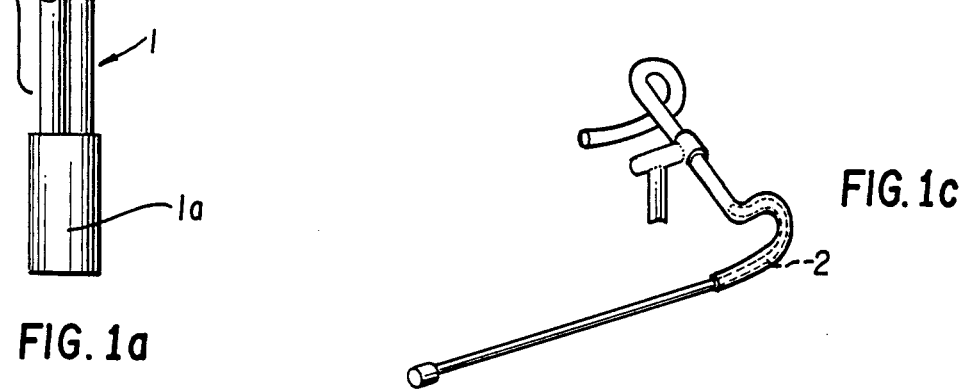
FIG. 2
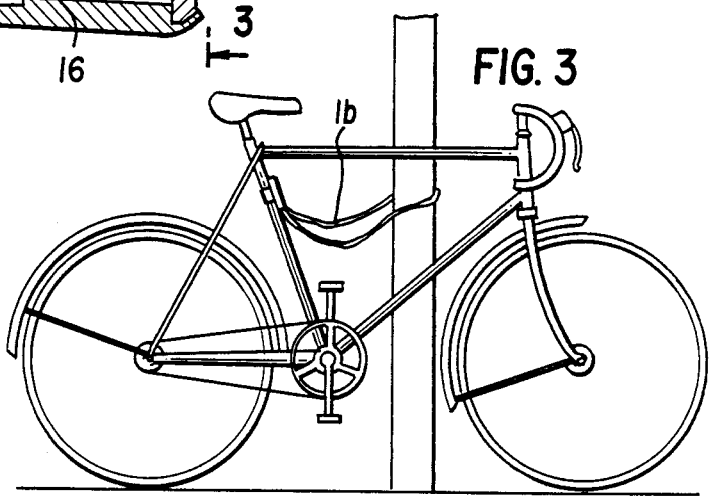
FIG. 3

SPRING-FREE LOCKING CABLE LOCK

BACKGROUND OF THE INVENTION

1. Field of the Invention

The invention is a continuation-in-part of the U.S. Pat. No. 4,693,098 and generally pertains to locking systems for securing vehicles such as bicyles, motor scooters, and the like, to stationary structures, in order to prevent theft when the vehicles are left unattended by the rider.

In particular, the invention pertains to tubular or chamber storageable flexible cable-type locking systems for securing bicycles, motor scooters, and like vehicles, to stationary structures, in order to prevent theft of the vehicle.

2. Brief Description of the Prior Art

Older types of locks for securing bicycles have been padlocks which have an elongated clasp which interlocks the spokes of the bicycle wheel with portions of the frame of bicycle, however, this type of locking system could not deter theft from one who is disposed to lifting the bicycle into a vehicle to carry it away.

More recent types of locks for securing bicycles are cable-type locks which are anchored to a part of the frame of the bicycle and have a cable of adequate length to be secured around a stationary structure such as a tree, post or the support member of a bicycle rack at the location where the bicycle is to be left. The locks so provided are elongated flexible cables which carry locking elements on its opposite ends, and which can be extended through the frame and around a stationary structure, and the ends lock together to secure the bicycle to the structure.

In cable locking systems having the cable secured to some tubular or chamber part of the bicycle frame, such as the handlebar, it is necessary to use a key to remove the cable from a tubular structure of the bicycle frame, such as the handlebar.

These cable locking systems, which require the use of a key, have intricate or complicated locks.

U.S. Pat. No. 4,693,098 discloses a cable locking system for securing bicycles and like vehicles to stationary structures. Due to the configuration of the internal elements of the lock part of the cable locking system a key is not required when starting the procedure of locking bicycles and the like to any fixed structures.

However, it has become desirable to retain the integrity of the locking system while eliminating or simplifying some elements of the internal elements of the lock part of the cable lock system.

It has been found that the spring element which biases the sliding latch plate in U.S. Pat. No. 4,693,098 can be eliminated by fashioning a latch plate which: (1) eliminates the arc of radius 30a; and (2) changes or shortens the square-shaped opening or space in the latch plate to a rectangular-shaped opening in order to prevent the plate from rising unless the cam on the lock cylinder is rotated by use of a key into the unlocked position, to accomodate the phallic-headed cable of two equal lengths.

SUMMARY OF THE INVENTION

It is a general object of the invention to provide a simpler cable vehicle locking system or device that allows a vehicle such as a bicycle to be quickly secured to a stationary structure.

It is a further object of the invention to provide a simple cable vehicle locking system which eliminates the spring mechanism of the lock portion; uses a simpler sliding plate; requires a key to begin the procedure of locking a vehicle, such as a bicycle, to a stationary structure; and requires a key to release said vehicle from said structure.

A yet further object of the invention is to provide a cable vehicle locking system which does not require the use of a key to remove the cable from a tubular part of the bicycle frame, such as the handlebar, prior to the procedure of locking-up the vehicle to a stationary structure with the use of a key.

These and other objects and advantages of the invention will become more apparent in the detailed description and accompanying drawings.

BRIEF DESCRIPTION OF THE DRAWINGS

A preferred, but non-limiting, embodiment is illustrated in the drawings, where:

FIG. 1a shows the two ends of the phallic head plug positioned together.

FIG. 1b shows the two ends of the phallic head plug spaced apart from each other.

FIG. 1c shows the cable extending from a bicycle handle bar.

FIG. 2 is a cross sectional view of the lock and its internal mechanism.

FIG. 3 is a perspective view showing a bicycle locked to a stationary structure, and an enlarged view in perspective of the lock attached to a portion of the bicycle frame.

DETAILED DESCRIPTION OF THE INVENTION

Figure 4:
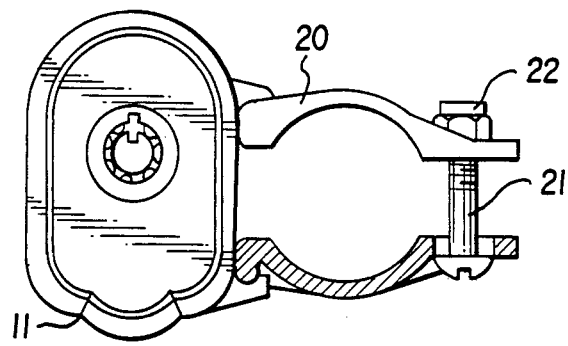
FIG. 4 is a view taken along line 3—3 of FIG. 2; wherein the lock is attached to clamps fastened by means of a bolt and nut to part of the frame (not shown) of a bicycle.

In referring to the drawings, it can be seen from FIG. 1 that the cable 1 is composed of two equal lengths of steel alloy cables swaged together at one end (1a) to form a folded length of cable (1b).

Affixed to each of the spread apart cable ends are identical halves (1c) of a missile shape or phallic head plug (1d). When folded together cable 1 is permitted to be slid either in storageable arrangement inside tubular chamber handlebar 2 in a non-key removable manner, or phallic head plug (1d) is permitted to be inserted in key removable locking engagement in the inner body of the lock, as shown in the locking mechanism of FIG. 6.

FIG. 2 depicts locking mechanism (10), comprised of inner body (11), which accommodates lock plug cylinder (12). The outer housing (13) of said locking mechanism receives sliding latch plate (14). Sliding latch plate (14) is protected or safe guarded against potential drilling or cut-through by insert plate (16), which is made of a hardened steel alloy. When outer housing (13) receives inner body (11) and the two pieces are fastened together by well known or conventional means, the lock is formed. An opening (17), in the lock receives cable end plug (1d), which engages the sliding latch plate in the semi-circle (B), formed by radius 30b of FIG. 5, when the cam 18 on the lock cylinder is rotated via a key to the unlocked position. When the cam on the lock cylinder is in the locked position the cable end-tip cannot be inserted into the locking mechanism because the cam on the cylinder prevents the upward movement or lifting of the slide plate due to the shortened rectangular space 30c in the plate. This configuration allows a spring element which normally holds the sliding latch plate down, to be eliminated.

This eliminates and simplifies the number of components or elements in the internal configuration of the lock part of the cable locking system.

Figure 5:
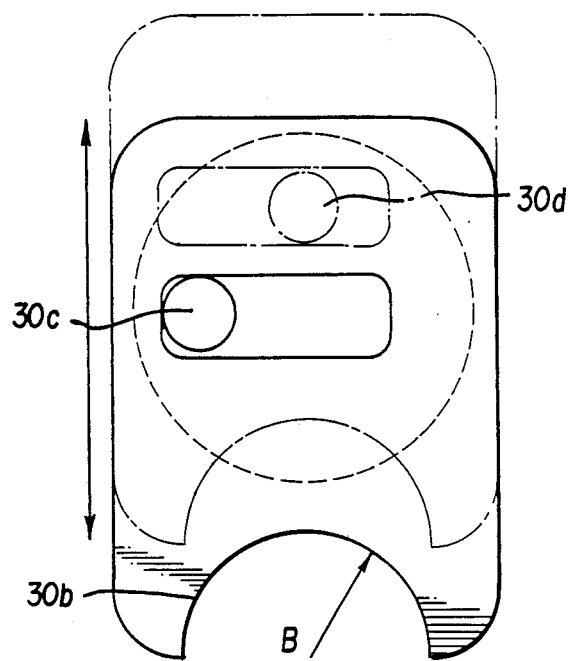
FIG. 5 is an enlarged isolated view in perspective of the sliding latch plate taken along line 4—4 of FIG. 2.

In order to secure the cable end-tip into the locking mechanism, a key must first be inserted to turn the cam on the lock cylinder from the locked to the unlocked position shown by the dotted lines of the lifted plate in FIG. 5. When the plate is raised or lifted as shown in the dotted lines, the cable end-tip is inserted into the locking mechanism. The key is then rotated to allow the cam to move the plate back to the locked position, where said plate engages the groove portion of the cable end-tip or end plug.

Figure 6:
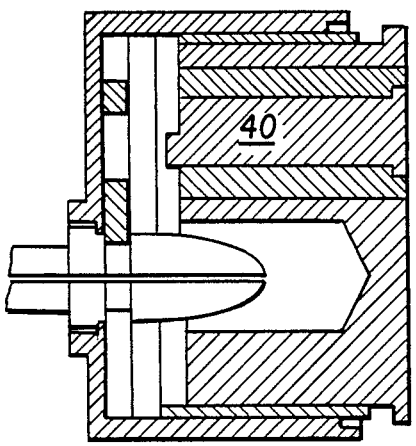
FIG. 6 is a cross sectional view of the lock and its internal mechanisms with the two-part head portion of the folded cable locked into the inner body of the lock portion of the cable vehicle locking device.

The two halves comprising the cable end plug (1d) are then secured inside of the lock, as shown in FIG. 6.

FIG. 3 depicts a bicycle secured to a stationary structure after the cable (16) in the spread apart position has been passed around the structure, and folded into a length of cable to align the two identical halves of the plug, which is locked by insertion into the lock, which is attached to the bicycle frame by the clamps (20), which are fastened together by means of bolt (21) and nut (22), as shown in FIG. 4.

In order to release cable end plugs (1d) from the lock, sliding latch plate (14) is removed from the groove in the cable end plug. This is accomplished by inserting a key into lock plug cylinder (12) in a direction opposite from and above the direction in which the cable end plug is inserted. When the inserted key (not shown) is turned, cam (18) lifts sliding latch plate (14) away from the groove and into the position shown by the dotted lines. The end plug is then free, and can be removed from the lock. The outer cylinder part of lock plug cylinder (12) is prohibited from turning freely by retaining pin (19), which allows the plug portion of (12) to turn independent of the cylinder portion, thereby allowing cam (18) to rotate.

Retaining pin (19) also prohibits lock plug cylinder (12) from being removed from inner body (11) after the lock components are assembled and fastened together.

As indicated, in order to release cable head plug (1b) from the locked position shown in FIG. 6, a key is required. The key (not shown) is inserted into the opening of the lock plug rotatable cylinder (40) from a direction opposite from the direction in which the head plug is inserted and rotated until the cam affixed thereto lifts the sliding latch plate from the groove.

The intricate sliding latch plate component of the lock shown in FIG. 5 of U.S. Pat. No. 4,693,098 is thus simplfied to a point where the lock can function without a spring. For example, the dual radii portions of the lower semi-circular open portion of the latch plate is eliminated, and the square space in the latch plate is made rectangular and thereby shortened to prevent the plate from lifting until the cam on the lock cylinder is rotated by a key.

While the non-key locking cable device for vehicles has been described by reference to particular embodiments, it is to be understood that many variations can be made in the invention device, without departing from the invention scope.

What is claimed is:

1. A spring-free cable-lock device for tubular frame vehicles, wherein the cable member is storeable in a hollow frame of the vehicle and is removable without a key from said hollow and capable after insertion into a lock member affixed to said vehicle of locking said vehicle with a key to a stationary structure comprising:

two equal lengths of cables swaged together at one end and having identical halves of a phallic head plug with grooves therein at another end; and a locking mechanism comprising a sliding latch plate; said latch plate having in its lower part a semi-circular opening into which said phallic head is insertable when the latch plate is lifted upwardly to an unlocked position upon rotation of a key inserted in an opening of a lock plug rotatable cylinder at the opposite end and above said semi-circular opening, and lockable when the groove in said phallic head plug is aligned with the semi-circle, when said plate is moved downwardly upon rotation of said key in an opposite direction; said plate having a rectangular opening above said semi-circular opening which prevents plate lifting until said cam on said lock cylinder is rotated via a key into said unlocked positon.

2. The cable-lock device of claim 1, wherein said sliding latch plate is protected from cut-through by an insert protective plate.

3. The cable-lock device of claim 1, wherein a retaining pin member prohibits an outer cylinder part of said lock plug cylinder from turning freely, and allows the plug portion to turn independently of the cylinder portion, thereby allowing a cam to rotate.

4. The cable-lock device of claim 1, wherein a retaining pin member prohibits said lock plug cylinder from being removed from an inner body of said lock after said lock components are assembled and fastened.

5. The cable-lock device of claim 1, wherein the said swaged end of said cables form a part of a vehicle handlebar when said cables are folded and said phallic head is inserted into hollow handlebar member.

* * * * *